United States Patent
Gyde et al.

(10) Patent No.: US 6,980,198 B1
(45) Date of Patent: Dec. 27, 2005

(54) MULTIFUNCTION KEYBOARD FOR ADVANCED CURSOR DRIVEN AVIONIC FLIGHT DECKS

(75) Inventors: Mike G. Gyde, Cave Creek, AZ (US); Mark I. Snyder, Glendale, AZ (US); Michael J. Stewart, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 292 days.

(21) Appl. No.: 09/680,585

(22) Filed: Oct. 6, 2000

Related U.S. Application Data (60) Provisional application No. 60/233,825, filed on Sep. 19, 2000.

(51) Int. Cl.[7] .............................. G09G 5/08; G09G 5/00
(52) U.S. Cl. ...................... 345/157; 345/168; 345/184
(58) Field of Search ................................ 345/157, 156, 345/161, 163, 167, 168, 172, 184; 340/973, 340/985; 701/3, 4, 23, 24

(56) References Cited

U.S. PATENT DOCUMENTS

| | | | | |
|---|---|---|---|---|
| 3,725,724 A | * | 4/1973 | Vollum | 315/391 |
| 4,325,123 A | * | 4/1982 | Graham et al. | 701/110 |
| 4,561,049 A | * | 12/1985 | Deleganes et al. | 700/1 |
| 4,853,888 A | * | 8/1989 | Lata et al. | 345/172 |
| 4,908,612 A | * | 3/1990 | Bromley et al. | 345/159 |
| 5,416,705 A | * | 5/1995 | Barnett | 701/14 |
| 5,438,331 A | * | 8/1995 | Gilligan et al. | 341/35 |
| 5,715,163 A | * | 2/1998 | Bang et al. | 701/202 |
| 5,931,874 A | | 8/1999 | Ebert et al. | 701/1 |
| 6,104,969 A | | 8/2000 | Beeks | 701/1 |
| 6,112,141 A | | 8/2000 | Briffe et al. | 701/14 |

FOREIGN PATENT DOCUMENTS

| | | |
|---|---|---|
| EP | 0 763 714 A2 | 3/1997 |
| WO | WO 9813667 A | 4/1998 |

* cited by examiner

Primary Examiner—Jimmy H. Nguyen (57) ABSTRACT

An aircraft display and control system generally includes a processor, a cursor control and selection device, a multifunction keyboard, an aeronautical information database, a geographic database, and a plurality of display devices. Users, such as an aircraft pilot and copilot, can perform flight plan entry and modification by manipulating graphical and textual information on the display devices using the cursor control device and the multifunction keyboard. In one embodiment, the present invention provides an interface to flight deck information systems that is intuitive and easy to use, and which enables flight crew members to easily and effectively enter and modify data displayed by the aircraft flight deck, substantially centralizes avionics controls within one controller, and decreases flight crew "heads-down" time.

12 Claims, 7 Drawing Sheets

MULTIFUNCTION KEYBOARD FOR ADVANCED CURSOR DRIVEN AVIONIC FLIGHT DECKS

REFERENCE TO RELATED APPLICATION

This application claims priority from and the benefit of U.S. Provisional Patent Application Ser. No. 60/233,825, filed Sep. 19, 2000, the entire contents of which are hereby incorporated by reference.

TECHNICAL FIELD

This invention relates, generally, to data display systems and, more particularly, to a system and method for interaction with an aircraft information display system.

BACKGROUND INFORMATION

Aircraft flight displays continue to advance in sophistication, achieving increasingly higher levels of information density and, consequently, presenting a greater amount of visual information to be perceived and understood by the operator. In many applications, it is important that visual displays provide a proper cognitive mapping between what the operator is trying to achieve and the information available to accomplish the task. As a result, such systems increasingly utilize human-factor design principles in order to build instrumentation and controls that work cooperatively with human operators. Accordingly, the Federal Aviation Administration (FAA) has promulgated a number of standards and advisory circulars relating to flight instrumentation. More particularly, Title 14 of the U.S. Code of Federal Regulations, Federal Aviation Regulations (FAR) Part 25, Sec. 25.1321 et seq. provides guidelines for arrangement and visibility of instruments, warning lights, indicators, and the like. Similarly, detailed guidelines related to electronics displays can be found in FAA Advisory circular 20-88A, *Guidelines on the Marking of Aircraft Powerplant Instruments* (September 1985).

One area in particular that has not profited in advances in graphical user interfaces is the field of flight deck information systems, such as aircraft flight management systems (FMS). Current flight decks typically are designed with separate, dedicated controllers for avionics interface, such as, for example, radios, FMS, weather radar, display controllers, and the like. These controllers typically are installed in various locations across the flight deck and are operated by push buttons contained on the controller device. Although current-generation FMS systems generally have a dedicated controller and display called the MCDU (Multifunction Control Display Unit) or CDU (Control Display Unit), flight plan entry and editing continues to be performed using cumbersome, text-based techniques that have not changed significantly in the last decade. As a result, flight crews frequently complain that current flight management systems (FMS) are non-intuitive, difficult to interpret, and require too much "heads-down" time. Indeed, due to the high cockpit workload involved, many flight crews abandon the FMS altogether, choosing instead to fly the aircraft using the autopilot.

Systems and methods are therefore needed to overcome these and other limitations of the prior art. Specifically, there is a long felt need for an interface to flight deck information systems that is intuitive and easy to use, and which enables flight crew members to easily and effectively enter and modify data displayed by the aircraft flight deck. Further, there is a long felt need for an interface to aircraft flight deck information systems that substantially centralizes avionics controls within one controller and decreases flight crew "heads-down" time.

BRIEF SUMMARY OF THE INVENTION

The present invention provides systems and methods for an integrated graphical user interface that facilitates the entry and editing of aircraft data using an enhanced multifunction keyboard. In accordance with various aspects of the present invention, one or more users (e.g., a pilot and a co-pilot) located within the aircraft may provide input to a processor through one or more cursor control devices and/or one or more integrated multifunction keyboards and receive visual feedback via an electronic display on the aircraft flight deck. The electronic display includes various graphical elements associated with the lateral position, vertical position, flight plan and/or other indicia of the aircraft's operational state as determined from avionics data and/or various data sources. Through use of one or more cursor control devices and/or one or more integrated multifunction keyboards, one or more users may view, modify, or otherwise interact with the displayed flight plan and/or other such indicia graphically and textually in accordance with feedback provided by the display.

BRIEF DESCRIPTION OF THE DRAWINGS

A more complete understanding of the present invention may be derived by referring to the following detailed description and claims when considered in connection with the following illustrative figures, wherein like numerals denote like elements.

DETAILED DESCRIPTION OF EXEMPLARY EMBODIMENTS

Systems and methods in accordance with various aspects of the present invention facilitate one or more users' interaction with an aircraft information display.

In this regard, the present invention may be described herein in terms of functional block components and various process steps. It should be appreciated that such functional blocks may be realized by any number of hardware, firmware, and/or software components configured to perform the various specified functions. For example, the present invention may employ various integrated circuit components, such as, for example, memory elements, digital signal procession elements, look-up tables, and the like, which may carry out a variety of functions under the control of one or more microprocessors or other control devices. Such general techniques and components that are known to those skilled in the art are not described in detail herein.

Figure 1:
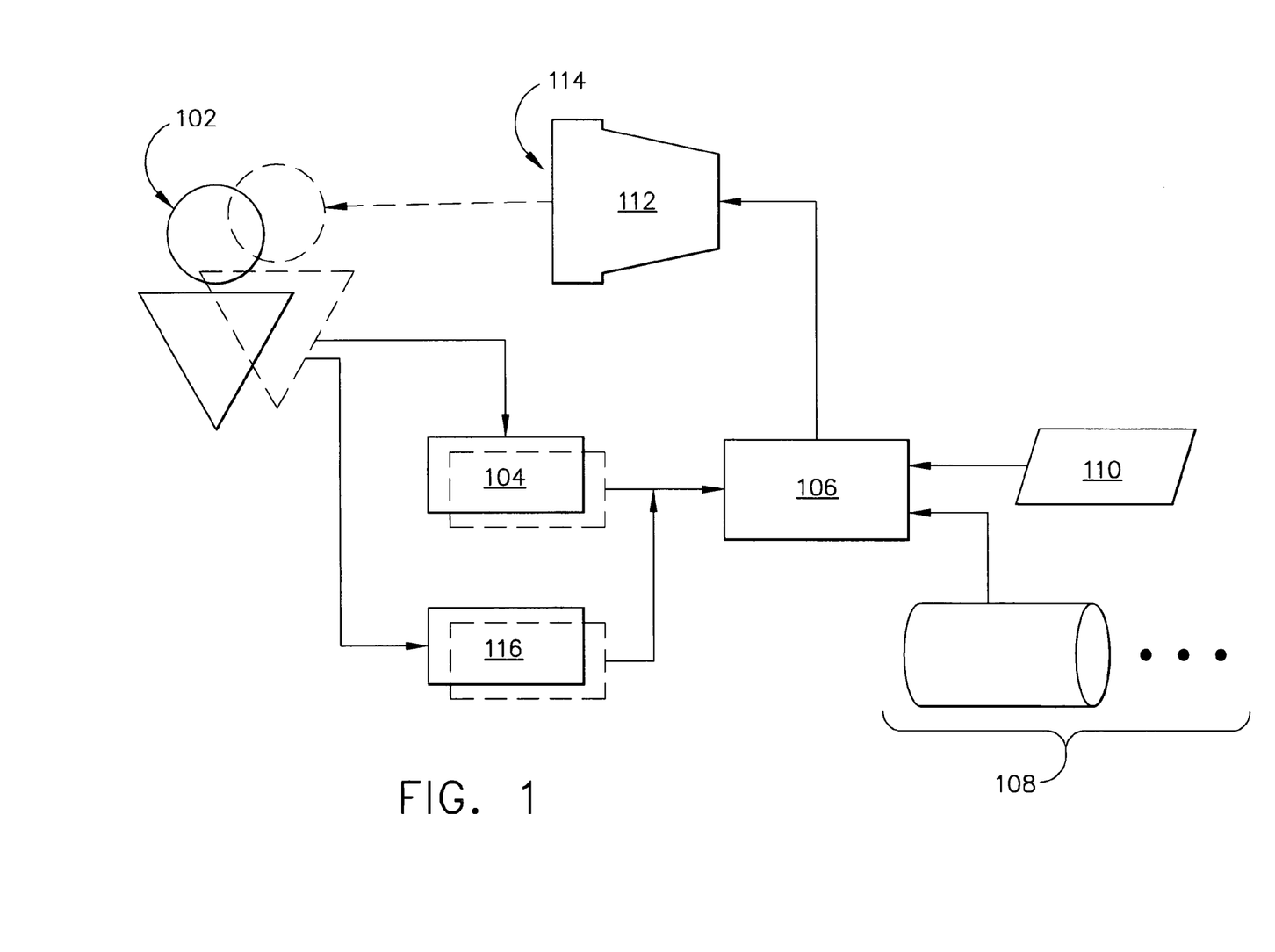
FIG. 1 is a schematic overview of a user interface in accordance with one embodiment of the present invention.

Referring now to FIG. 1, a system in accordance with various aspects of the present invention includes a processor 106 configured to communicate with an associated monitor (or monitors) 112, one or more data sources 108, one or more cursor control devices 104, one or more multifunction keyboards 116 and avionics data 110. In general, one or more users 102, such as, for example, a pilot and/or a co-pilot, located within an aircraft (not shown), provide input to processor 106 through cursor control device (or devices) 104, and receive visual feedback via a display 114 produced by monitor 112. Display 114 includes various data elements associated with the lateral position, vertical position, flight plan and/or other indicia of the aircraft's operational state as determined from avionics data 110 and/or data sources 108. Through use of cursor control device(s) 104 and/or multifunction keyboard(s) 116, user(s) 102 may interact with the data elements graphically and/or textually in accordance with feedback provided by display 114.

Cursor control device 104 includes any device suitable to accept input from user 102 and to convert that input to a graphical position on display 114. Various joysticks, mice, trackballs, and the like are suitable for this purpose. In one embodiment, cursor control device 104 includes a touch-pad interface device with a thumb actuation switch on the side. In this embodiment, the user rests his or her hand on a built-in palm rest to stabilize the hand, position the fingertip for pointing, and position the thumb for clicking. In an alternate embodiment, cursor control device 104 is a trackball device coupled with one or more keys or push-buttons used to select data captured by the cursor.

Multifunction keyboard 116 generally comprises a keypad device that includes, for example, the alphabet, numbers from zero to nine, mathematical operator keys (e.g. +, −, *, /), decimal, CLR/DEL (Clear/Delete), ENT or ENTER, SHIFT, SPACE, left and right arrow keys, and multiple programmable "shortcut" keys. Moreover, multifunction keyboard 116 may include a feedback display and any number of additional knobs, switches, buttons, keys, and the like, all of which may be configured to implement an effective interface between the user and the flight deck. An exemplary multifunction keyboard device is detailed herein, for example, in FIG. 7 and the accompanying text.

Monitor 112 may include any display monitor suitable for displaying the various symbols and information detailed herein. Many conventional monitors are suitable for this task, including, for example, various cathode ray tube (CRT), liquid crystal display (LCD), Heads Up Display (HUD), Helmet Monitored Display (HMD) and other electronic display systems.

Processor 106 encompasses one or more functional blocks used to provide flight management and control, to interface with cursor control device 104, and to drive monitor 112. In this regard, processor 106 may include any number of individual microprocessors, memories, storage devices, interface cards, and other conventional components known in the art.

Avionics data 110 includes aeronautical information related to the state of the aircraft derived from an aeronautical information database. Data sources 108 include various types of data required by the system, such as, for example, flight plan data, data related to airways, navigational aids (Navaids), symbol textures, navigational data, obstructions, font textures, taxi registration, Special Use Airspace, political boundaries, COM frequencies (en route and airports), approach information, and the like. Typically, for example, a geographical information database is included within data sources 108.

Figure 2:
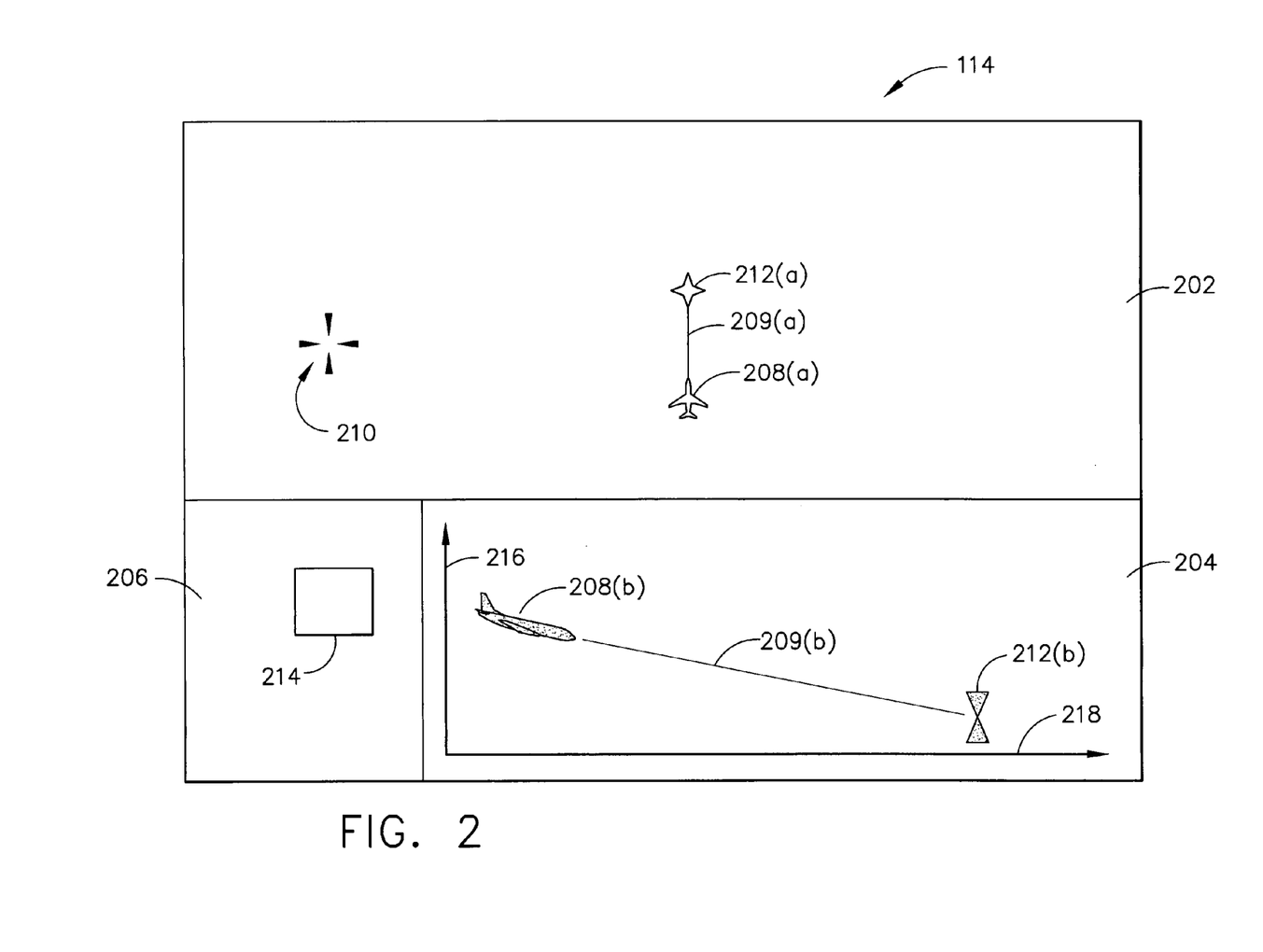
FIG. 2 is a schematic overview of a display arrangement in accordance with one aspect of the present invention.

Referring now to FIG. 2, a display 114 in accordance with various exemplary aspects of the present invention includes a lateral view 202, a vertical profile view (or "vertical profile") 204, and a hot-map view (or simply "hot-map") 206.

Vertical profile 204 suitably includes a side-view aircraft symbol 208(*b*), one or more waypoint symbols 212(*b*) (or constraint symbols, described in detail below), line segments 209(*a*) connecting waypoint symbols 212(*b*), a first axis 218 representing lateral position and/or time, and a second axis 216 designating altitude. As with the lateral view 202, the system is preferably configured such that the user may modify the flight plan and trajectory via graphical manipulation of symbols 212(*b*) using cursor symbol 210.

In one embodiment, the various areas of display 114 may be expanded to facilitate display and editing of the flight plan. For example, when the user clicks cursor 210 within vertical profile 204 of display 114, that region expands to fill a larger area of the total display area of display 114.

Referring further to FIG. 2, lateral view 202 suitably includes various graphical elements ("symbols") representing, among other things, the lateral position of the aircraft with respect to the ground. Lateral view 202 may also include various map features, including terrain, political boundaries, and the like. In the illustrated embodiment, lateral view 202 includes a top view aircraft symbol 208(*a*), one or more waypoint symbols 212(*a*), and line segments 209(*a*) connecting waypoint symbols 212(*a*), wherein waypoint symbols 212(*a*) are associated with the current flight path of the aircraft. Display 114 may also include one or more cursor symbols 210 positioned in accordance with input from one or more users 102 (see FIG. 1) received via one or more cursor control devices 104 (see FIG. 1). While the details of the user's interaction with lateral view 202 will be discussed further below, in general, cursor 210 is suitably positioned by the user in order to select and graphically edit data elements appearing on display 114, such as, for example, the flight plan associated with waypoints 212(*a*).

As briefly mentioned above, in addition to lateral view 202 and vertical profile 204, an embodiment of the present invention includes a hot-map region which encompasses a larger albeit simplified lateral area than that shown in lateral view 202. A rectangular or square outline corresponding to the region shown in lateral view 202 may be displayed in the hot map region.

Figure 3:
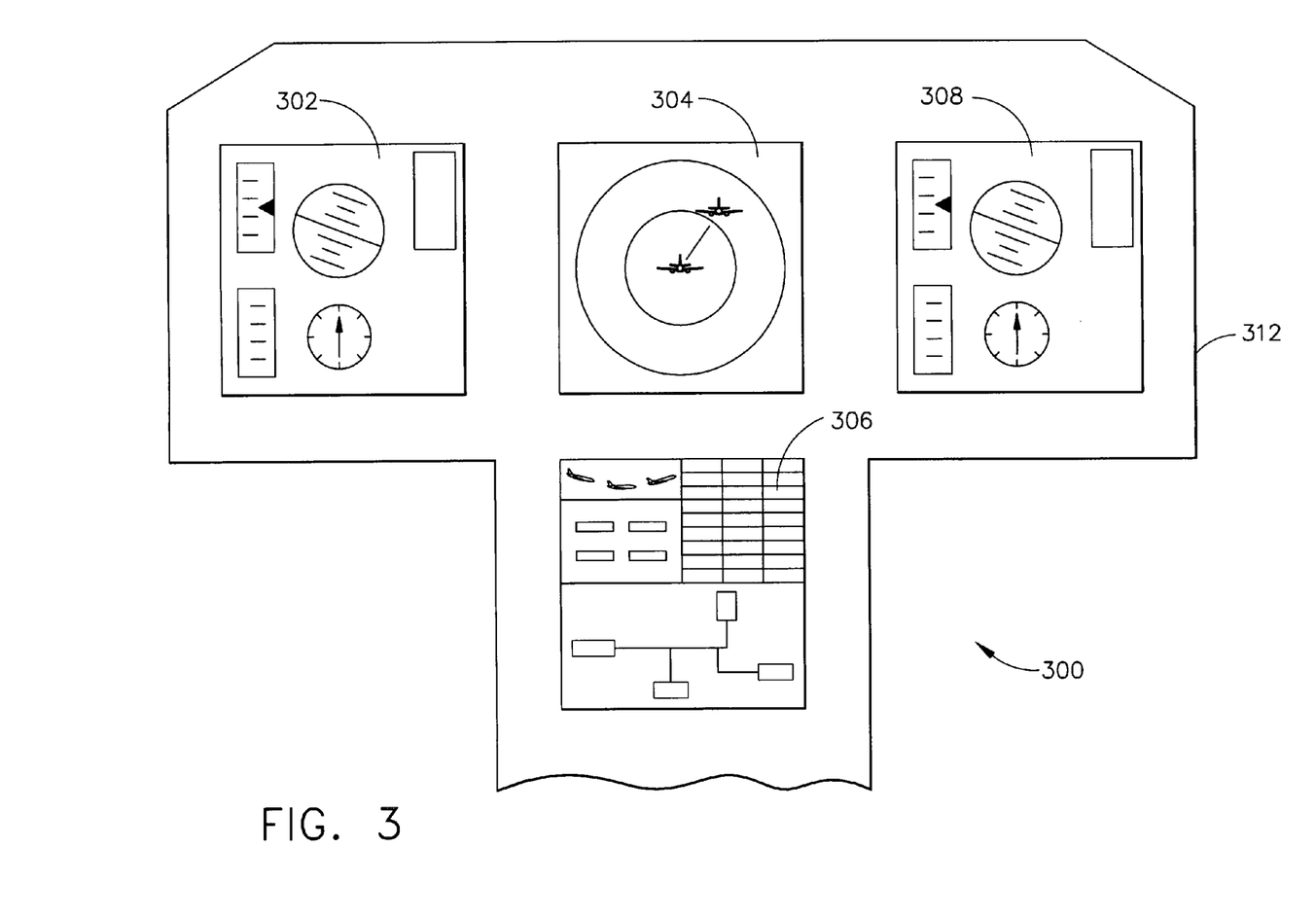
FIG. 3 is a schematic overview of a flight deck which embodies certain aspects of the present invention.

FIG. 3 is a representation of certain features of an aircraft cockpit display layout in accordance with one embodiment of the present invention. Displays 302, 304, 306, and 308 are included on an instrumental panel 312 of a flight deck 300 and generally comprise four display devices (such as display devices 114 in FIG. 1), such as, for example, color flat-panel LCD screens. Outboard displays 302 and 308 each constitute a Primary Flight Display (PFD). All flight information and short-range information is located on displays 302 and 308. Inboard displays 304 and 306 each constitute a Multi-Function Display (MFD). Displays 304 and 306 can be used by more than one person, requiring only coordinated management. Instrument panel 312 also includes standby instruments (not shown). The standby instruments may be of conventional type, such as an altimeter, airspeed indicator, attitude indicator, and instrument landing system (ILS) glide slope/localizer indicator. Alternatively, they could be implemented as flat panel electronic instruments. Regardless of whether conventional or flat panel electronic instruments are utilized, these instruments are generally utilized only as a back-up to displays 302, 304, 306, and 308.

Thus, in the cockpit of FIG. 3, one user (e.g., a pilot) may be present at the left side of the cockpit, in front of display 302 and adjacent to display 308, while another user (e.g., a co-pilot) may be present at the right side of the cockpit, in front of display 306 and adjacent to display 308. Displays 302, 304, 306, and 308 need not be coplanar. Indeed, in a typical aircraft cockpit, displays 302, 304, and 306 may be substantially coplanar, with display 308 located on a separate console between the pilot and co-pilot. It should also be noted that displays 302, 304, 306, and 308 need not be identically or substantially identically sized and are not shown to scale, as each display may have a different aspect ratio than that shown.

Figure 4:
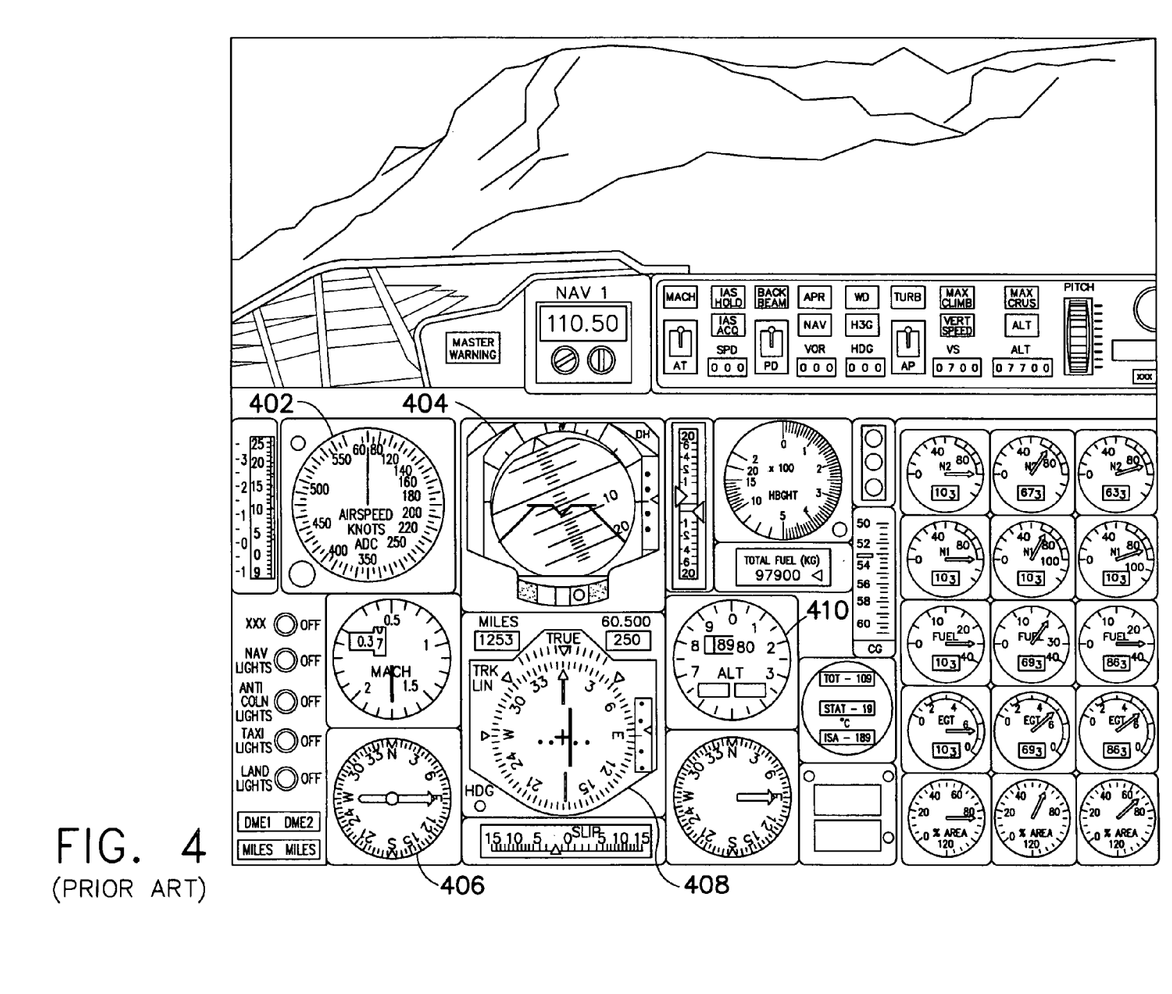
FIG. 4 is a schematic diagram of the components of a prior art flight deck.

Displays 302, 304, 306 and 308 provide a functionality that formerly was provided by a plurality of gauges on an instrumentation panel. In the past, a cockpit generally would contain separate gauges to indicate, inter alia, attitude, altitude, airspeed and vertical speed. This is illustrated in FIG. 4, which is a graphical representation of an exemplary prior art cockpit. Illustrated in FIG. 4 are, inter alia, airspeed indicator 402, attitude indicator 404, radio compass 406, horizontal situation indicator 408, and altimeter 410.

Figure 5:
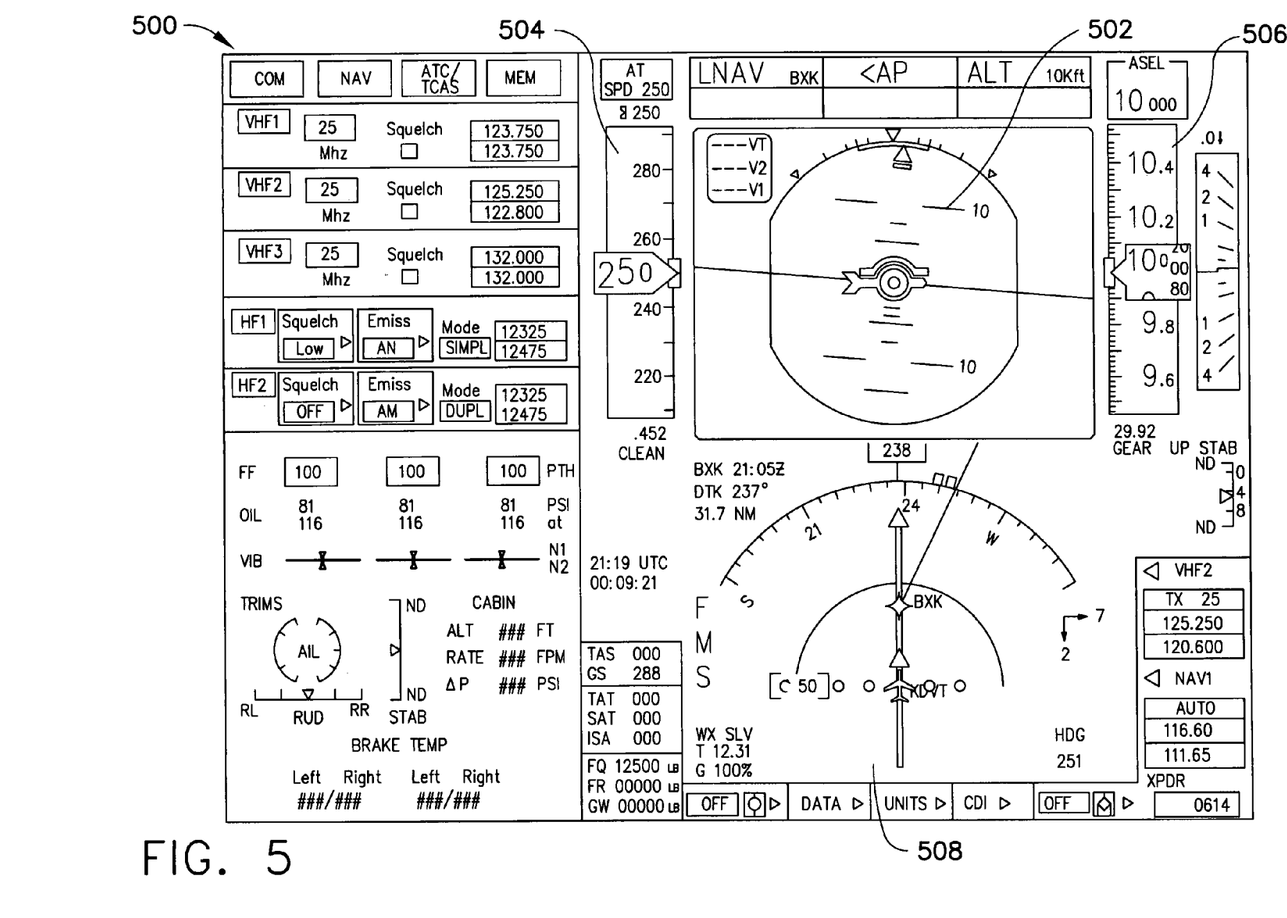
FIG. 5 is a representation of an exemplary display device in accordance with certain aspects of the present invention.

The individual gauges illustrated in FIG. 4 have in recent years been replaced by various display units. For example, FIG. 5 illustrates an exemplary display 500. Display 500 is a single CRT or LCD display unit in which graphical representations of an attitude indicator, airspeed indicator, altimeter, and horizontal situation indicator have been rendered in separate areas of display 500 by a computer. Specifically, area 502 contains a rendering of an attitude indicator, area 504 displays the airspeed, altimeter 506 displays the altitude, and heading source indicator (HSI) 508 shows the heading of the aircraft.

Referring back to FIG. 3, in typical usage, display 302 and display 308 will show substantially identical information, such that the pilot and the co-pilot have access to the same information. Typically displays 302 and 308 will be configured in a manner similar to that shown in FIG. 5, such that the attitude, altitude, airspeed, and heading are displayed. Display 304 may be configured, for example, to display navigational information, such as an indication of the current heading of the aircraft and data regarding the surrounding area.

Displays 304 and 306 are used for managing the flight plan, carrying out flight path modification, and monitoring aircraft systems and sensors availability. The corresponding procedures involve extensive use of the cursor control and/or multifunction keyboard devices. Alternatively, the functions of the keyboard and/or cursor control could be performed by other suitable conventional means, such as direct voice input.

Figure 7:
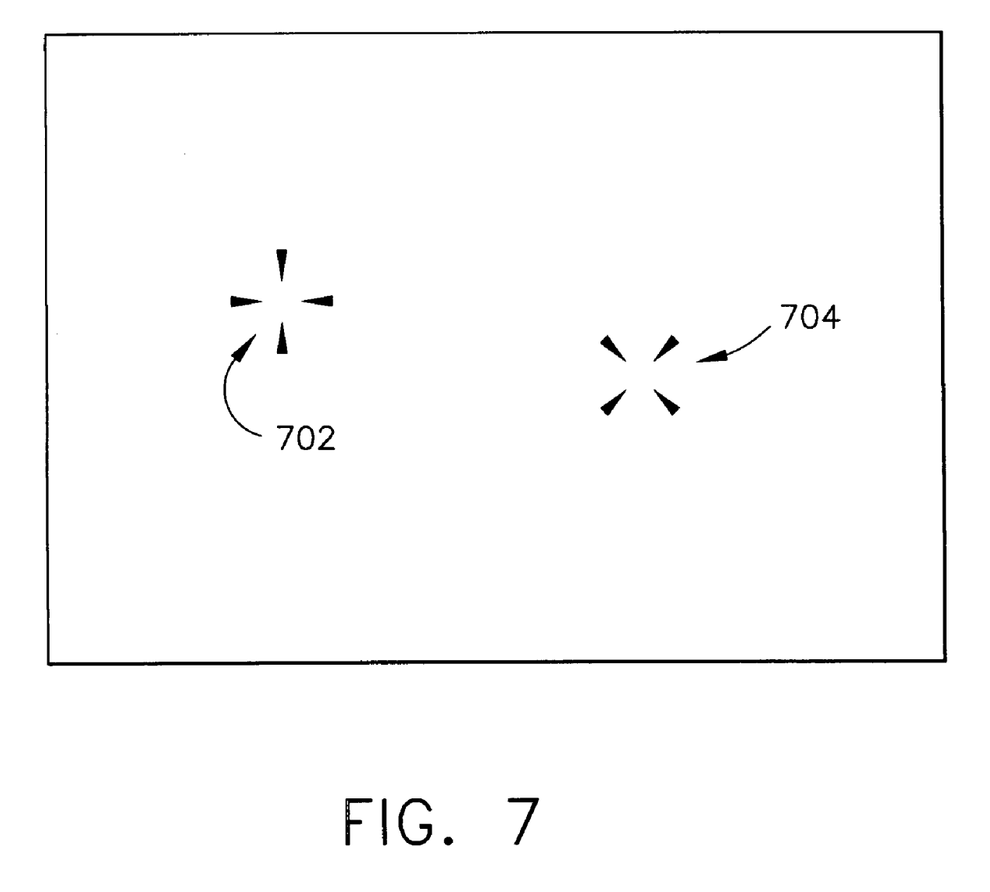
FIG. 7 is a diagram showing the configuration of different cursor symbols displayed on multi-function display units of the flight deck of FIG. 3.

One aspect of the design of displays 304 and 306 is the ability for both pilot and copilot to access both displays from each seat, using a distinctive cursor, as shown in FIG. 7. Both displays provide the same options and are coupled to synchronized FMS processors. Both displays are synchronized such that, for example, when the pilot is working on, for example, an en route high altitude chart on display 304, the copilot can work on the same chart on display 306, using a different range scale or type of format. The pilot and copilot can also work together on the same panel, on the same display, each one using a separate multifunction keyboard and/or a separate cursor control device to interact with the display system. One further aspect of joint access to displays 304 and 306 is that only one cursor and/or keyboard may be active within a given "panel" or window at a time.

Access to and between displays 304 and 306 may be implemented by a "cursor skip" function, which selectively permits each cursor to move about each display. In one embodiment, this cursor skip function is selectively implemented by cursor control velocity. For example, if a pilot slowly operates the cursor control device to move the cursor to the bottom of display 304, the cursor will stop at the bottom edge of display 304 to prevent the cursor from inadvertently "skipping" to display 306. Subsequent slow movement of the cursor control device downward will not result in further downward movement of the cursor. Rapid operation of the cursor control, however, will cause the cursor to "skip over" to display 306. The pilot can then use the cursor and related buttons, knobs, and/or keys to implement any feature available on display 306. Similarly, this cursor skip function may be implemented to control movement of the cursor between and among displays 302, 304, and 306 and between and among displays 304, 306, and 308. The cursor skip function could, of course, be implemented using a selector other than cursor control velocity. For example, a dedicated button or key could be provided, operation of which would be required to permit "cursor skip" to an adjacent display.

The following functions are redundantly included in both displays 304 and 306 to permit a flight to depart even if one display is inoperable: display engine parameters and warning/caution messages; display all aircraft electrical, fuel, air conditioning, hydraulics systems; display horizontal situation and vertical profile; manage FMS and AFIS; manage normal and abnormal checklists; and display general maintenance items in flight that can be easily understood by the crew.

In various embodiments, the cursor control devices and/or the multifunction keyboards are the primary means of interacting with the multifunction displays (MFDs). Operation of the cursor involves the actions of cursor "capture" and "selection," commonly know in the personal computer world as "point and click." For example, when a pilot is interacting with horizontal situation indicator, the cursor is movably superimposed upon points on the map by action of the cursor control device. Certain of these points on the map constitute special positions recognized by the system: RNAV points, routes, airports, and the like. When the cursor is superimposed on one of such points, the point is "captured," that is, the background around the captured point changes color, and the cursor is displayed behind this background. To "select" the captured point, an action button on the cursor control device is operated. This causes data stored for this point in system memory to appear as an information window displayed at the cursor location. The pilot can then begin modification of the parameter displayed in the window, using the multifunction keyboard, for instance. It is also possible and may be beneficial to designate soft keys and labels, which will cause the corresponding function or option to be selected.

In an alternate embodiment, operation of the cursor control device and the multifunction keyboard involves the actions of cursor "capture" by the cursor control device and data entry by the multifunction keyboard device. In other words, an intermediate "selection" step may be unnecessary. In one aspect of such an embodiment, a data field may be "selected" merely by virtue of the cursor being positioned over or superimposed upon the field. Thus, data entry using the multifunction keyboard may commenced without having to "click" a button on the cursor control device to select the desired data field. As described above, in one exemplary aspect of the invention, the user may easily visually identify which data field has been selected, because in addition to the cursor being positioned over the data field (i.e., "capturing" the data field or point), the background around the captured point or field may change color.

Figure 6:
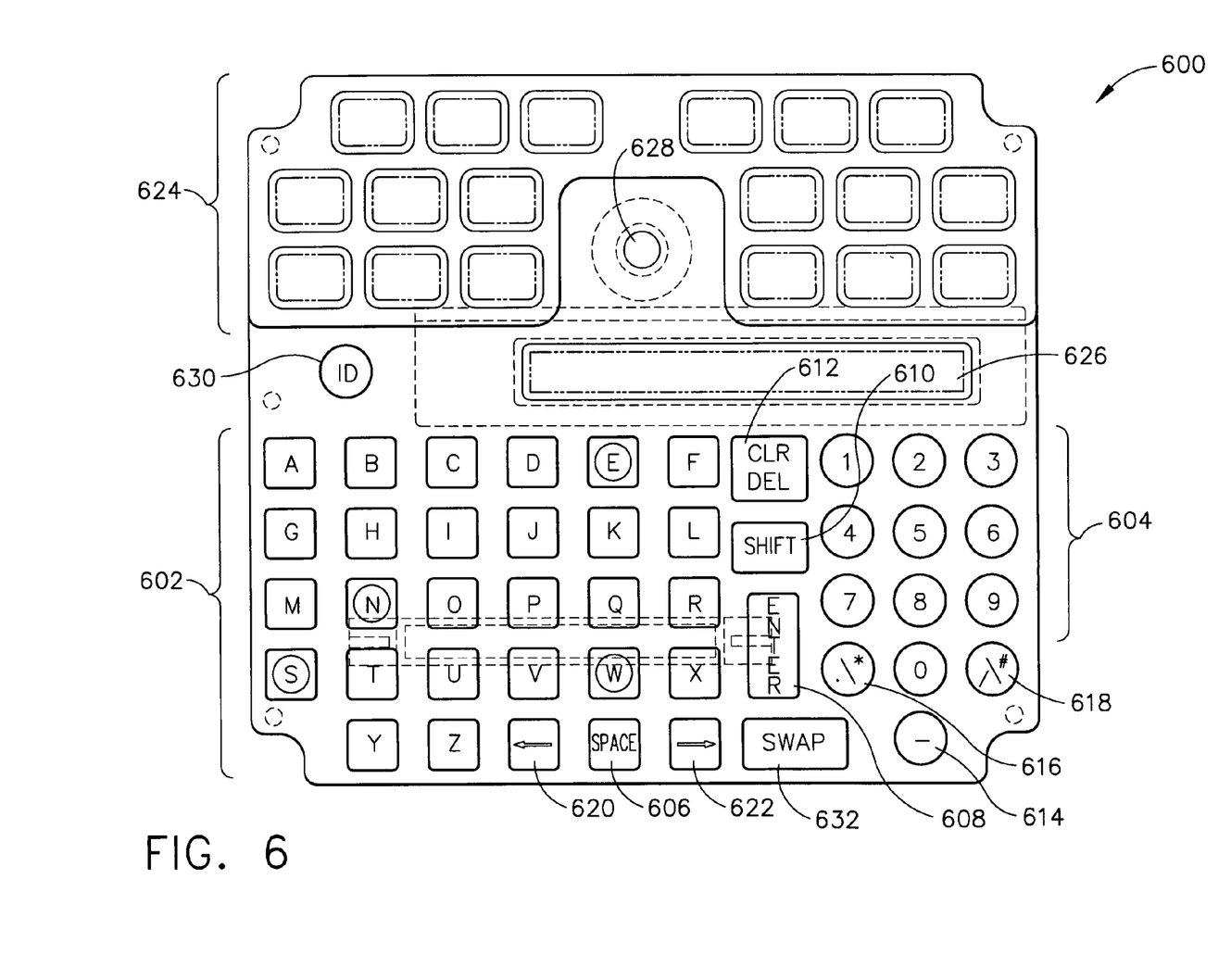
FIG. 6 illustrates an exemplary multifunction keyboard device in accordance with one embodiment of the invention.

An exemplary multifunction keyboard device, such as that denoted in FIG. 1 as multifunction keyboard device 116, is illustrated in FIG. 6 in accordance with various aspects of one embodiment of the present invention. A multifunction keyboard device 600 may generally include an expanded keypad that comprises alphabet keys 602, number keys from zero to nine 604, a SPACE key 606, an ENTER key 608, a SHIFT key 610, a CLR/DEL ("Clear/Delete") key 612. Keyboard device 600 further includes a hyphen or minus sign ("–") key 614, a decimal (".") and/or asterisk ("*") key 616, a backslash ("/") and/or pound sign ("#") key 618, and left and right arrow keys 620 and 622, respectively. In addition, multifunction keyboard 600 may include an ID key 630 and a SWAP key 632.

In one aspect of the embodiment illustrated in FIG. 6, multifunction keyboard 600 includes one or more "shortcut" keys 624 that may be programmed or otherwise configured to perform any one or more of a variety of functions desired by the designer and/or user. Integration of shortcut keys 624 into multifunction keyboard 600 may enable the flight crew to perform a variety of functions by operating one (or just a few) keys instead of completing these same tasks through a series of keystrokes, cursor clicks, and other repetitive operations. For example, by configuring one of shortcut keys 624 appropriately (using, for instance, suitable computer software), a single keystroke may activate a desired window or panel within the flight deck display system and position the cursor in the appropriate location for data entry. Thus, shortcut keys 624 are generally configured to move the user's cursor rapidly from one location (or function) to another location (or function) with a single keystroke.

Alternatively, when integrated into a system that does not utilize a visible cursor and/or one or more cursor control devices, shortcut keys 624 may be configured to provide direct access to functions of the aircraft information display system. Thus, instead of moving the user's cursor rapidly from one location (or function) to another location (or function), the shortcut keys may function to target predetermined data fields and make them accessible to user input and/or modification.

In a further aspect of the embodiment illustrated in FIG. 6, multifunction keyboard 600 includes a feedback display window 626. Feedback display window 626 may be, for example, an LED or LCD window, or any other suitable electronic display device. Feedback display window 626 generally operates to display to the user the data being prepared for entry into the flight deck information system, such that the user may monitor the data for accuracy as it is being typed, without having to alternate between looking up at the display panel and looking down at the keypad. Once the user strikes the "ENTER" key and thereby sends the new data to the processor, feedback display window 626 may be cleared of the entry. Clearing the feedback display may inherently force the user to then look up from the keypad and view the real data as it is displayed on the flight deck display panel, which may enhance the safety of the aircraft and its passengers and crew by encouraging frequent monitoring of newly entered and recently modified flight data.

In various embodiments, if a user inputs data using the keypad on the multifunction keyboard, yet no characters are displayed in feedback display window 626, the user knows immediately that the cursor of the flight deck information system is not accepting the desired input. This may occur for any of a variety of reasons, such as, for example, if the user's cursor is not located in an appropriate data field, or if the user's cursor has been temporarily inactivated because a second user's cursor was already active in a particular data field (as discussed elsewhere herein). Additionally, display systems in accordance with various aspects of the present invention may be configured to reject data entries that are recognizably invalid. In such a system, a memory element may be utilized to store values or ranges of values for valid data points, and the processor may be configured to access these values in determining the validity of a user's input value. If the user's input value falls outside the range of values stored in memory, the system may be signaled by the processor to reject the input as invalid. For instance, if a pilot attempts to change the value for the aircraft's cruising altitude to, say, 90,000 feet, when in fact the aircraft is not designed to fly at 90,000 feet, such a data entry would be rejected by the system and the previously displayed data would remain unchanged. In the aforementioned ways, integration of a feedback display window into a multifunction keyboard may help to decrease and/or eliminate errors occurring during "heads down" data entry.

Multifunction keyboard 600 may also include a knob 628, which may be used, for example, to "dial in" numerical data in certain predefined data fields. For example, knob 628 may be useful in modifying or "tuning in" radio frequency data or in adjusting altitude fields wherein the data points are generally defined in predetermined increments of, for instance, 1000 feet. In various embodiments, knob 628 may be configured to illuminate in certain situations, such as, for example, when the user is changing data using the knob, or when the cursor is positioned over a data field in which the data may be adjusted using the knob.

In various embodiments, there may be no priority given to either pilot in interacting with displays 304 and 306. Each pilot can work with his or her cursor and/or multifunction keyboard on both displays, and both pilots can also work together on the same display, or on the same function on different displays. In the latter case, the system accounts for the chronological order of actions. One possible exception, however, may be that if one pilot has already begun a modification, the other pilot cannot interfere with this parameter as long as the procedure is not terminated. However, the second pilot can modify another parameter on the same display. Hence, it is possible to get both cursors on the same display. The cursors for each pilot may be graphically different, as shown, for example, in FIG. 7. In FIG. 7, the cursors differ in their geometric configuration. In other practical applications of the present invention, the cursors may be distinguished by color, size, shape, or other suitable configuration.

The MFDs are configured to allow the pilots to modify selected parameters displayed in a window. When a cursor is positioned over a particular parameter, its background changes color and a modification can be effectuated by entering a new value with a keyboard, "dialing" a new value with a knob, or by any other means configured to perform such entries. While being modified, the parameter may be displayed cyan with cyan framing, or with any other format or color. When the modification is completed, the pilot presses the "ENT" or "Enter" key on the keyboard, or clicks the button on the cursor control device. If the pilot presses "ENT" or clicks without entering new data, the cursor automatically skips to the following parameter field. In one aspect of the invention, it is possible to exit the modification process by double-clicking the button of the cursor control device, so that the system returns to the previous status.

As mentioned briefly above, systems in accordance with the present invention preferably provide the ability to graphically (using, e.g., a cursor control device and textually modify and/or enter flight-plan information via the cursor-control device. It should be understood that the exemplary methods illustrated may include more or less steps or may be performed in the context of a larger process scheme. Furthermore, the various flowcharts presented in the drawing figures are not to be construed as limiting the order in which the individual process steps may be performed.

Thus it is apparent that there has been provided herein a system and a method for aircraft information display and control that fully meets the needs set forth above. Although the invention has been described and illustrated with reference to certain illustrative examples, it is not intended that the invention be limited to these illustrative embodiments. Those of skill in the art will recognized that various modifications and alternatives are possible without departing from the spirit of the invention. For example, although reference has been made throughout to "aircraft," it is intended that the invention also be applicable to vehicles that are on the ground, in the water, in the air, or in space. Accordingly, it is intended that the invention include all such modifications and alternatives as fall within the scope of the appended claims.

What is claimed is:

1. An aircraft display and control system comprising:
   a plurality of flat-panel color display devices disposed on an aircraft flight deck control panel;
   a cursor control device for receiving pilot-entered cursor movement commands;
   a multifunction keyboard for receiving pilot-entered data, the multifunction keyboard including a plurality of keys and a knob for dialing in numerical data;
   a processor coupled to said display devices, said cursor control device, and said multifunction keyboard, the processor generating a viewable image of a movable cursor upon the display devices, said cursor being movable by at least one of said cursor control device and said multifunction keyboard to select any data field from a plurality of data fields within the display, wherein the processor facilitates data entry into each of the plurality of data fields upon selection thereof by the cursor control device using both the plurality of keys and the knob of the multifunction keyboard, wherein said knob is configured to selectively illuminate when the data field selected by the cursor is one in which data in the data field selected by the cursor can be adjusted using the knob.

2. The system of claim 1 wherein said multifunction keyboard further includes one or more programmable shortcut keys, and wherein said programmable shortcut keys are programmable to move a cursor to a selected data field within the display such that the processor facilitates data entry into the selected data field using the multifunction keyboard.

3. The system of claim 1 wherein the processor facilitates data entry into the data field using the multifunction keyboard by facilitating entry of numerical data using the knob.

4. The system of claim 1 wherein said processor is farther configured to access avionics data associated with the aircraft.

5. The system of claim 1 wherein said processor is further configured to access at least one data source.

6. The system of claim 1 wherein said multifunction keyboard includes a feedback display window.

7. The system of claim 6, wherein said feedback display window is configured to provide a visual display of said user input only when said cursor is located in a data field that accepts said user input.

8. The system of claim 6, wherein said feedback display window is configured to provide a visual display of the pilot-entered data entered by the multifunction keyboard.

9. An aircraft display and control system comprising:
   a plurality of flat-panel color display devices disposed on an aircraft flight deck control panel;
   a cursor control device for receiving pilot-entered cursor movement commands;
   a multifunction keyboard for receiving pilot-entered data, the multifunction keyboard including a plurality of keys, a knob for dialing in numerical data and a programmable shortcut key, the multifunction keyboard further including a feedback window for displaying pilot-entered data entered on the multifunction keyboard;
   a processor coupled to said display devices, said cursor control device, and said multifunction keyboard, the processor generating a cursor upon the display devices, said cursor being movable by said cursor control device to select any data field from a plurality of data fields within the display device, and wherein said cursor is further movable to select a data field from the plurality of data fields by said programmable shortcut key, wherein the processor facilitates entry of data into each of the plurality of data fields upon selection thereof by the cursor control device using both the plurality of keys and the knob on the multifunction keyboard such that data entry into any of the plurality of data fields can be selectively made using both the plurality of keys and the knob of the multifunction keyboard, and wherein said knob is configured to selectively illuminate when the data field selected by the cursor is one in which data in the data field selected by the cursor can be adjusted using the knob.

10. The system of claim 9 wherein said multifunction keyboard includes a feedback display window.

11. The system of claim 10, wherein said feedback display window is configured to provide a visual display of said user input only when said cursor is located in a data field that accepts said user input.

12. The system of claim 10, wherein said feedback display window is configured to provide a visual display of the pilot-entered data entered by the multifunction keyboard.

* * * * *